United States Patent
Bauer et al.

(12)

(10) Patent No.: US 6,361,709 B1
(45) Date of Patent: Mar. 26, 2002

(54) OPTICALLY TRANSPARENT POLYMERIC SOLID ELECTROLYTE

(75) Inventors: Stephan Bauer, Ostercappeln; Bernd Bronstert, Otterstadt; Helmut Möhwald, Annweiler; Michael Neuss, Carlsberg; Uwe Burkhardt, Ludwigshafen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/577,072

(22) Filed: May 23, 2000

(30) Foreign Application Priority Data

May 26, 1999 (DE) .......................................... 199 23 906

(51) Int. Cl.[7] .................................................. G02F 1/15
(52) U.S. Cl. ........................ 252/62.2; 359/270; 359/275
(58) Field of Search ........................ 252/62.2; 359/270, 359/275

(56) References Cited

U.S. PATENT DOCUMENTS

| 4,887,890 A | 12/1989 | Scherber et al. ............ 350/357 |
| 5,244,557 A | 9/1993 | Defendini et al. ..... 204/192.29 |

FOREIGN PATENT DOCUMENTS

| EP | 392 839 | 10/1990 |
| EP | 461 685 | 12/1991 |
| EP | 499 115 | 8/1992 |
| WO | 98/44576 | 10/1998 |

OTHER PUBLICATIONS

Ullmann's Enc. of Ind. Chem, Sixth Ed., 1998, Optical Plastics (Hofmann).

*Primary Examiner*—C. Melissa Koslow
(74) *Attorney, Agent, or Firm*—Keil & Weinkauf

(57) ABSTRACT

Optically transparent polymeric solid electrolytes comprising a polymeric binder, a filler, a conductive salt, an ion-solvating plasticizer and, if desired, further additives and auxiliaries, a process for the preparation of solid electrolytes of this type, by compounding and thermoplastic shaping, and their use in electrochromic systems and displays.

7 Claims, No Drawings

OPTICALLY TRANSPARENT POLYMERIC SOLID ELECTROLYTE

The invention relates to an optically transparent polymeric solid electrolyte comprising a polymeric binder, a filler, a conductive salt, an ion-solvating plasticizer and, if desired, further additives and auxiliaries, to a process for the production of solid electrolytes of this type, and to their use in electrochromic systems and displays.

Optically transparent polymeric solid electrolytes are known in principle. They are used, in particular, in electrochromic systems, for example in electrochromic glazing systems, in which the light transparency can be adjusted reversibly and steplessly by application of electrical potentials. The structure of such systems is disclosed, for example, in EP-A 461 685, DE-A 36 43 690 and US 5,244,557. An electrochromic glazing system typically has the following layer sequence: glass sheet—transparent electroconductive layer—electrochromic electrode—electrolyte—counterelectrode—transparent electroconductive layer—glass sheet.

In these systems, the solid electrolytes have the job of transporting cations to the electrochromic electrode or away from the electrode, depending on the polarity of the applied electric field. This process causes the electrochromic electrode its color to change. Solid electrolytes which are suitable for use in electrochromic systems have to satisfy a multiplicity of different requirements. They must have high electrical conductivity and high optical transparency in the visible spectral region, and in addition they must be usable in a broad temperature range without impairment to their optical, electrical and mechanial properties. Further requirements include, for example, good adhesion properties so that a stable multilayer system is achieved with the other layers of the glazing system, and good plastic deformability in order also to enable the production of curved panes, for example for use in automobiles.

U.S. Pat. No. 5,244,557 discloses an electrochromic glazing system having an electrolyte of polyethylene oxide and $P_2O_5$. EP-A 392 839, EP-A 461 685 and EP-A 499 115 disclose solid electrolytes containing polar polymers based on polyethylene oxide, polyethylene oxide copolymers or graft copolymers, and conductive salts which are soluble in these polar polymers, in particular Li salts. The solid electrolytes are prepared by dissolving the starting materials in suitable organic solvents, coating the substrates therewith, and re-evaporating the solvent. However, long drying times are necessary to remove the solvents completely. Thus, US 5,244,557 discloses drying times of 20 hours and EP-A 392 839 discloses drying times of 8 hours. The processes are therefore inconvenient and expensive.

WO 98/44576 discloses a process for the production of separator, electrode and solid electrolyte films containing electrochemically active and/or electrochemically inert solids, for use in lithium ion batteries. The specification also proposes the use of films of this type in electrochromic systems. However, the use of the battery films in the area of electrochromic glazing systems is afflicted with a number of disadvantages. The solid electrolytes disclosed have inadequate transparency, or none at all, for use in electrochromic glazing systems. Plastic deformability and good tack are properties which are undesired in lithium ion batteries, but which a solid electrolyte for electrochromic glazing systems should have. Furthermore, solid electrolytes for the battery area are restricted to aprotic systems.

It is an object of the present invention to provide a polymeric solid electrolyte which has good transparency, good conductivity and good mechanical properties and can be converted in a simple manner into electrochromic glazing systems.

We have found that this object is achieved by optically transparent polymeric solid electrolytes having a light transparency of >80% and a conductivity of greater than $10^{-6}$ S/cm at 20° C., comprising a polymeric binder, a filler, a conductive salt, an ion-solvating plasticizer and, if desired, further additives and auxiliaries, by a process for the production of solid electrolytes of this type, and by their use in electrochromic systems and displays.

Suitable polymeric binders are in principle all thermoplastically processable polymers having adequate transparency. Particularly suitable are thermoplastics which have a light transparency of greater than 80% in the UV/VIS region. Examples of suitable polymers are polyacrylates, in particular those comprising acrylates or methacrylates of the general formula $H_2C=CHR_1—COOR_2$, where $R_1$ is methyl or hydrogen, and $R_2$ is a straight-chain, branched or cyclic hydrocarbon radical, for example methyl, ethyl, n-propyl, isopropyl, n-butyl, isobutyl, sec-butyl, tert-butyl, n-amyl, isoamyl, sec-amyl, tert-amyl, neopentyl, n-hexyl, n-heptyl, n-octyl, 2-ethylhexyl, n-nonyl, isononyl, n-decyl, n-undecyl, n-dodecyl, cyclohexyl, 3,3,5-trimethylcyclohexyl, isobornyl, vinyl or allyl groups. In a particular embodiment, the $R_2$ radicals can also carry one or more substituents, in particular chlorine or fluorine. Examples thereof are 2,2,2-trifluoroethyl, 2,2,3,3-tetrafluoropropyl and 1,1,1,3,3,3-hexafluoroisopropyl groups. It is also possible to employ mixtures of two or more acrylates.

It is also possible to employ copolymers of acrylates with one or more comonomers. Particularly suitable comonomers are the following:

Acrylamides and methacrylamides. Possible substituents on the amide nitrogen of acrylamide or methacrylamide, in addition to hydrogen, are the groups mentioned above under $R_2$. It is also possible to employ suitable imides, for example maleimide.

Acrylonitrile or methacrylonitrile.

Styrene derivatives of the formula

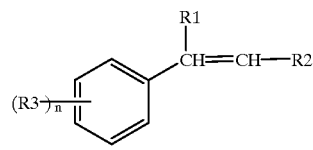

The radical R1 is preferably hydrogen or methyl, and the radicals R2 and R3 are preferably hydrogen or hydrocarbon radials. The preferred comonomer is styrene.

Straight-chain, branched and/or cyclic $C_2$— to $C_{20}$-olefins, such as ethylene, propylene, 1-butylene, 2-butylene, butadiene, isoprene, 1-pentene, 2-pentene, 3-pentene, 1-hexene, 2-hexene, 3-hexene, 2,4-hexadiene, heptenes, octenes, nonenes, decenes, cyclohexene and norbonene.

The preferred comonomers are ethylene, propylene and 1-butylene.

Particularly preferred thermoplastically processable binders are the polymers usually employed for the production of optical components from plastics. Polymers of this type and their properties are described, for example, in "Optical Plastics" (Ullmann's Encyclopedia of Industrial Chemistry, $6^{th}$ Edition, 1998, Electronic Release). Examples of such polymers are polymethyl methacrylate, polycyclohexyl methacrylate, copolymers of cyclohexyl methacrylate and methyl methacrylate, copolymers of cyclohexyl methacrylate and/or methyl methacrylate and styrene, polystyrene, styrene-acrylonitrile copolymers, copolymers of styrene and maleic anhydride, polycarbonates, for example those made from bisphenol A and phosgene, polyvinylbutyral, partially or fully hydrolyzed polyvinyl acetate/polyvinyl alcohol and copolymers thereof, for example ethylene/polyvinyl acetate copolymers, diphenyl sulfide carbonate, polytrifluoromethylstyrene, polymethylpentene, and cellulose esters, for example cellulose acetate, cellulose propionate and cellulose acetobutyrate. It is also possible to employ suitable thermoplastic polyurethanes, polyolefins or polyesters, such as polyethylene terephthalate or polybutylene terephthalate.

It is also to employ mixtures of two or more different polymeric binders, provided that the polymers are mutually compatible. The molecular weight of the polymers can be selected depending on the desired properties of the solid electrolyte. The glass transition temperature of the polymer employed should preferably be below −30° C. The polymeric binder is usually present in an amount of from 5 to 97% by weight, based on all constituents of the solid electrolyte. The solid electrolyte preferably contains from 10 to 80% by weight, particularly preferably from 10 to 50% by weight, of the filler.

The solid electrolyte according to the invention furthermore contains a filler having a primary particle size of from 1 nm to 20 $\mu$m. In the case of spherical or approximately spherical particles, this size relates to the diameter, while in the case of particles of irregular shape, for example needle-shaped particles, it relates to the longest axis. The fillers should have a light transparency, in each case measured on pure material, of greater than 80%.

The possible fillers can basically be selected from two different classes: firstly fillers having a primary particle size which is equal to or greater than the wavelength of visible light. Such particles must have the same refractive index as the polymeric binder in order that scattering does not occur. However, their primary particle size should not exceed 20 $\mu$m, preferably 10 $\mu$m, since otherwise homogeneous solid electrolytes are not obtained.

Suitable fillers are secondly those whose primary particle size is from 1 to 300 nm, ie. whose size is less than the wavelength of visible light. The refractive index of fillers of this type can differ from that of the polymer matrix. The fillers are generally colorless, but the invention also covers the use of colored fillers for special applications.

Examples of suitable fillers include polymer particles, which may also be crosslinked, such as those of polystyrene, polycarbonate or polymethyl methacrylate (for example Agfaperl®). Also suitable are, in particular, inorganic fillers having a primary particle size of from 1 to 300 nm. Examples of suitable inorganic fillers are glass powder, glass nanoparticles, for example Monospher® (Merck), glass microparticles, for example Spheriglas® (Potters-Ballotini). Also suitable are inorganic oxides and mixed oxides, in particular of the elements silicon, aluminum, magnesium, titanium and calcium. Examples of such fillers are silicon dioxide, in particular pyrogenic oxides, for example Aerosil® (Degussa), silicates, for example talc, pyrophyllite, wollastonite, aluminosilicates, for example feldspar or zeolites. The fillers can also be coated with suitable dispersion auxiliaries, adhesion promoters or hydrophobicizing agents. It is also possible to employ mixtures of two or more fillers. Particular preference is given to hydrophobicized pyrogenic silica gel acids, for example Aerosil®R812, Aerosil®VP R8200 and Aerosil®R974.

The filler is usually present in an amount of from 1 to 80% by weight, based on all constituents of the solid electrolyte.

The solid electrolyte preferably contains from 8 to 78% by weight, particularly preferably from 20 to 67% by weight, of the filler.

The solid electrolyte according to the invention contains at least one conductive salt. Suitable cations are generally the elements Li, Na, K, Cs, Mg and Ag. The preferred cation is Li. Examples of suitable conductive salts are LiCl, LiPF$_6$, LiBF$_4$, LiAsF$_6$, LiCF$_3$SO$_3$, LiC(CF$_3$SO$_2$)$_3$, LiN(CF$_3$SO$_2$)$_2$, Li(CnF$_{2n+1}$)SO$_3$, LiC[(C$_n$F$_{2n+1}$)SO$_2$]$_3$, LiN[C$_n$F$_{2n+1}$)SO$_2$]$_2$, where n is in each case 2 to 20, LiClO4, LiN(SO$_2$F)$_2$, LiSbF$_6$, LiAlCl$_4$, LiSiF$_6$, NaPF6, NaBF$_4$, NaCF$_3$SO$_3$, NaClO$_4$, KPF$_6$, KBF$_4$, KCF$_3$SO$_3$ and AgCF$_3$SO$_3$. It is also possible to employ organic salts, for example sodium octylsulfate, lithium dodecylbenzenesulfate, or the like. The preferred conductive salts are LiClO$_4$ and LiCF$_3$SO$_3$. It is also possible to employ mixtures of two or more conductive salts.

The conductive salt is usually employed in an amount of from 1 to 40% by weight, based on all constituents of the solid electrolyte. The solid electrolyte preferably contains from 2 to 10% by weight, particularly preferably from 3 to 8% by weight, of the filler.

Suitable plasticizers are conventional high-boiling plasticizers or solvents. Advantageous plasticizers are those in which the ions, in particular Li ions, can be solvated. Plasticizers function on the one hand as solvents for the conductive salts and furthermore affect the mechanical properties of the solid electrolyte, for example by lowering its glass transition temperature. Suitable plasticizers which are compatible with the binder and filler employed in each case are selected by the person skilled in the art. It should be noted here that the plasticizer must not significantly impair the transparency of the solid electrolyte. Both protic and aprotic plasticizers can be employed. Examples of protic plasticizers are glycol and oligomeric polyethylene glycols or polypropylene glycols which have terminal OH groups. Plasticizers of this type are available, for example, under the trade name Pluriol®. It is also possible to employ primary alcohols, for example 2-ethylhexanol.

Examples of aprotic plasticizers are linear or cyclic organic carbonates of the general formula $R_1O(CO)OR_2$, where $R_1$ and $R_2$ are each straight-chain or branched alkyl radicals or aryl radicals, which may also carry inert substituents, for example chlorine or bromine. Particularly suitable are carbonates having 1 to 6 carbon atoms. $R_1$ and $R_2$ can also be linked to one another to form a, for example, 5- or 6-membered ring. It is also possible for carbon atoms to be substituted by O. Examples of carbonates of this type are ethylenecarbonate, propylenecarbonate, butylenecarbonate, diethylcarbonate, dipropylcarbonate, diisopropylcarbonate, dibutylcarbonate, di(2-methoxyethyl) carbonate and di(2-butoxyethyl)carbonate. Also suitable are organic phosphates $R_1R_2R_3PO_4$, where $R_1$, $R_2$ and $R_3$ are each straight-chain or branched alkyl radicals having 1 to 8 carbon atoms or aryl radicals, which may also be further substituted. In particular, carbon atoms can also be substituted by O. $R_1$, $R_2$ and $R_3$ can also be bonded to one another in pairs to form a ring. Examples of suitable phosphates are trimethyl phosphate, triethyl phosphate, tripropyl phosphate, tributyl phosphate, triisobutyl phosphate, tripentyl phosphate, trihexyl phosphate, trioctyl phosphate, tris(2-ethylhexyl)phosphate, tridecyl phosphate, diethyl n-butyl phosphate, tris(butoxyethyl)phosphate, tris(2-methoxyethyl) phosphate, tris(tetrahydrofuryl)phosphate, tris(1H, 1H, 5H-octafluoropentyl)phosphate, tris(1H, 1H-trifluoroethyl) phosphate, tris(2-(diethylamino)ethyl) phosphate, tris(methoxyethoxyethyl)phosphate, tris (ethoxycarbonyloxyethyl)phosphate and tricresyl phosphate.

Suitable plasticizers are also esters of organic acids, for example esters of adipic acid or phthalic acid, such as 2-ethylhexyl adipate or 2-ethylhexyl phthalate. It may be advantageous to use cyclic esters, such as ω-butyrolactone, dimethyl-ω-butyrolactone, diethyl-ω-butyrolactone, ω-valerolactone, 4,5-dimethyl-1,3-dioxolan-2-one, 4,4-dimethyl-1,3-dioxolan-2-one, 4-ethyl-1,3-dioxolan-2-one, 4-methyl-5-ethyl-1,3-dioxolan-2-one, 4,5-diethyl-1,3-dioxolan-2-one, 4,4-diethyl-1,3-dioxolan-2-one, 1,3-dioxan-2-one, 4-methyl-1,3-dioxan-2-one, 5-methyl-1,3-dioxan-2-one, 4,4-dimethyl-1,3-dioxan-2-one, 5,5-dimethyl-1,3-dioxan-2-one, 4,6-dimethyl-1,3-dioxan-2-one or 4,4,6-trimethyl-1,3-dioxan-2-one, and 5,5-diethyl-1,3-dioxan-2-one. It may also be advantageous to use esters of inorganic acids containing —$(CH_2—CH_2O)_nCH_3$ groups, in particular esters of boric acid, carbonic acid, sulfuric acid and phosphoric acid. Esters of said type are disclosed in WO 98/44576, pages 27 to 31. It is also possible to employ ethers, for example dibutyl ether, dihexyl ether, diheptyl ether, dioctyl ether, dinonyl ether, didecyl ether, didodecyl ether, ethylene glycol dimethyl ether, ethylene glycol diethyl ether, 1,2-dimethoxypropane, diethylene glycol dibutyl ether, triethylene glycol dimethyl ether, tetraethylene glycol dimethyl ether or polyglycol alkyl ethers, -tetrahydropyran, 1,4-dioxane, 1,3-dioxane, 2,5-diethoxytetrahydrofuran or 2,5-dimethoxytetrahydrofuran. Also suitable are dimethylformamide, N-methylpyrrolidone and acetonitrile. It is also possible for mixtures of different plasticizers to be present in the solid electrolyte.

The plasticizer is usually present in an amount of from 1 to 90% by weight, based on all constituents of the solid electrolyte. The solid electrolyte preferably contains from 10 to 50% by weight, particularly preferably from 20 to 40% by weight, of the plasticizer.

The solid electrolyte according to the invention can furthermore, if desired, contain additives and auxiliaries. For example, antioxidants, for example Irganox®, Ultranox® or Sicostab®, UV stabilizers, for example Uvinul® or Irgastab®, can be present. It is furthermore possible to employ dispersion auxiliaries, for example Lutensol® or Sokalan® for the filler or adhesion promoter.

The amount of additives and auxiliaries can be selected by the person skilled in the art as needed. However, the amount should not exceed 30% by weight, preferably 10% by weight.

In a preferred embodiment of the invention, the solid electrolyte is in the form of a film. The thickness of the film is selected depending on the desired application. For example, the films can have thicknesses of from 5 pm to 5 mm. The films preferably have a thickness of from 10 pm to 2 mm.

The solid electrolyte according to the invention can be uncrosslinked, but can also be in crosslinked form. In the latter case, it also contains the products of the reaction of compounds added to effect the crosslinking, ie., for example, the polymers resulting from the photopolymerization of ethylenically unsaturated compounds using suitable photoinitiators.

All constituents of the solid electrolyte according to the invention form a homogeneous, generally colorless and crystal-clear composition. The filler is uniformly dispersed in the binder, and the conductive salt is completely dissolved. The light transparency is preferably greater than 80%, particularly preferably greater than 85%. However, the solid electrolyte according to the invention can also be milky, ie. have relatively high scattering contents, or colored if this is necessary for a certain application.

The solid electrolyte according to the invention can be prepared by plasticating and intensively mixing the above-mentioned constituents with one another in a suitable intensive mixer at elevated temperatures until the filler is homogeneously dispersed in the binder matrix and a clear, bubble-free composition is obtained. The temperature of the process depends on the selected polymers and plasticizers and is generally from 50 to 200° C. Suitable intensive mixers are, in particular, compounders or single- or multiscrew extruders.

The compounding can be carried out in compounding units of various designs, for example open-pan batch compounders or the internal mixers of related design, which can be fitted with one or two (co- or counterrotating) compounding screws, depending on the properties of the composition to be mixed. In continuous compounders (for example single-, twin- or multiscrew mixers), the compounding elements simultaneously effect material transport. The material being compounded can be compressed, degassed, plasticated and homogenized within the conveying zone.

Extrusion devices which can be employed are, for example, single- and twin-screw machines, for example single-screw mixing extruders (Reifenhauser, Krauss Maffei, Berstorf), co-rotating or counterrotating, closely intermeshing twin-screw compounders (Werner und Pfleiderer, Berstorff, APV), multiscrew extruders, Buss Ko-Kneter or counterrotating, non-intermeshing compounders (Farrel, JSW).

After the homogenization process, moldings, in particular films, can be shaped by suitable methods. Examples of suitable thermoplastic shaping methods which may be mentioned are melt extrusion, injection molding and pressing. In principle, all machines which are usually employed for processing and shaping thermoplastics can be employed here. The solid electrolyte according to the invention is preferably shaped into a film using a melt pump, a slot die and a suitable take-off device and/or a smoothing tool, in particular a chill roll polishing stack.

The film can subsequently be treated by further process steps, for example by rolling, calendering or chill-roll methods. In addition, a surface structure can be embossed in the films during this treatment. A surface structure of this type is helpful for various applications, for example for better contacting and lamination, for example onto smooth surfaces under the action of heat and vacuum.

Although melt extrusion is the preferred preparation method for the solid electrolyte according to the invention, the invention also covers other procedures, for example dissolution of all constituents, apart from the filler, in a suitable solvent, homogeneous dispersion of the filler therein, casting of a layer on a suitable substrate, and re-evaporation of the solvent.

Another process variant, although not a preferred one, is initially to prepare the solid electrolyte without conductive salts, and to incorporate the conductive salts at a later point in time by impregnating the solid electrolyte with a solution of the conductive salt in a suitable solvent.

The solid electrolyte according to the invention can also be crosslinked. The crosslinking can be carried out thermally by adding to the starting materials thermal crosslinking agents which do not yet crosslink at the melt-extrusion process temperature. After shaping, the crosslinking is initiated by warming the molding or film to elevated temperatures. However, radiation crosslinking is preferred. Crosslinking agents or auxiliaries, for example photoinitiators, which are necessary for this purpose are added to the starting materials and compounded and meltextruded therewith. Radiation crosslinking can be carried out, for example, by irradiation with high-energy radiation, such as ionic radiation, ionizing radiation, electron beams, X-rays or y-rays, if desired with use of additional initiators. The crosslinking is advantageously carried out using actinic light, in particular using UV light. To this end, compounds or monomers which can be polymerized in a known manner are employed. The monomers have at least one polymerizable ethylenic double bond. The choice of the type and amount depends on the desired properties of the solid electrolyte and on the compatibility with the other components, in particular with the binder. Suitable monomers here are in particular polar monomers which bind or solvate ions and can thus contribute toward the conductivity. Examples of preferred compounds which may be mentioned are those containing hydroxyl groups, amide groups or polyethylene glycol structural units. Also highly suitable are mono- and polyacrylates and/or -methacrylates of monohydric and polyhydric alcohols. For example, use can be made of (meth)acrylates of alkanols having 1 to 20 carbon atoms, such as methyl (meth)acrylate, ethyl (meth)acrylate, propyl (meth)acrylate, isopropyl (meth)acrylate, cyclohexyl (meth) acrylat; (meth)acrylates of polyhydric alcohols having 2 to 20 carbon atoms, for example 2-hydroxyethyl (meth) acrylate, 2-hydroxypropyl (meth)acrylate, ethylene glycol di(meth)acrylate, butanediol di(meth)acrylate, polyethylene glycol di(meth)acrylate or 1,1,1-trimethylolpropane tri (meth)acrylate, furthermore, polyethylene glycol mono (meth)acrylate monomethyl ether and 2-diethylaminoethyl acrylate. Also suitable are epoxide and urethane (meth) acrylates, as can be obtained, for example, by reacting bisphenol A diglycidyl ether with (meth)acrylic acid or by reacting mono- or diisocyanates with hydroxyalkyl (meth) acrylates and, if desired, with hydroxyl-containing polyesters or polyethers. Also suitable are derivatives of acrylamide and of methacrylamide, for example ethers of their N-methylol derivatives with monohydric and polyhydric alcohols, for example ethylene glycol, glycerol, 1,1,1-trimethylolpropane, or oligomeric or polymeric ethylene oxide derivatives.

Suitable initiators for the photopolymerization are, inter alia, benzoin or benzoin derivatives, such as α-methylbenzoin or benzoin ethers, benzil derivatives, such as benzil ketals, acylarylphosphine oxides, acylarylphosphinates, polycyclic quinones or benzophenones.

The crosslinking with actinic light can be carried out directly after the preparation of the solid electrolyte, ie., for example, by irradiating and crosslinking the solid electrolyte film produced by extrusion immediately after the extruder using suitable irradiation equipment. However, crosslinking thereof can also be delayed until a later point in time, for example until after installation in an electrochromic glazing system.

The solid electrolyte according to the invention can be used, in particular, for electrochromic glazing systems or mirrors and for displays. However, it can of course also be used in other systems in which polymeric solid electrolytes are employed.

Its advantages are particularly evident when used in the form of films. As is known, safety laminate glass screens, for example for automobiles, are produced by laminating two or more glass sheets together using a highly adhesive plastic film, for example made of polyvinylbutyral. The solid electrolyte films can in principle be incorporated into electrochromic glazing systems in the same way. Time-consuming and expensive coating steps are therefore superfluous.

The combination of filler and a polymeric binder allows particularly good control of the mechanical properties of the solid electrolyte. Flexible films having high ion conductivity which nevertheless do not flow or are not too soft can be produced very simply.

The following examples are intended to illustrate the invention without thereby restricting the scope of the invention.

The measurement values were obtained as follows:

| | |
|---|---|
| Deformability | The film was stressed at room temperature for 2 minutes with a steel ball (diameter 3.2 cm, weight: 133.5 g). The diameter of the ball impression on the film was determined |
| Conductivity [S/cm] | The direct-current conductivity of the films was determined by clamping the films between two lithium metal foils, each with a thickness of 150 μm, as electrodes. The contacting of the metal foils was carried out using in each case 0.05 ml of a 0.5 molar solution of $LiClO_4$ in propylene carbonate. The conductivity was measured at a voltage of +3 V and −3 V. The two values were averaged. |

EXAMPLE 1

The following components were employed:

| | | |
|---|---|---|
| Binder | 61.0 g of polymethyl methacrylate | 30.5% by weight |
| Plasticizer | 56.4 g of propylene carbonate | 28.2% by weight |
| Conductive salt | 10.6 g of lithium perchlorate | 5.3% by weight |
| Filler | 72.0 g of Aerosil VP R8200, hydrophobicized surface, tamped density 150 g/l, primary particle size: 21 nm | 36.0% by weight |

The conductive salt was dissolved in the plasticizer, and the resultant solution was compounded together with the binder in a laboratory compounder (IKA) for 1 hour at a jacket temperature of 130° C. until a homogeneous composition was obtained. The filler, divided into 3 portions, was then added and compounded in over the course of 3 hours at a jacket temperature of 130° C. A homogeneous composition was obtained.

The composition was removed from the compounding chamber and pressed in a heatable hydraulic press at a closing force of 3000 kN between two polyester films with a thickness of 125 μm at 130° C. to give a crystal-clear film having a thickness of 900 μm which conducts lithium ions. The film had a glass transition temperature of <−30° C. and a light transparency at 550 nm of >85%.

The mechanical and electrical data are shown in Table 1.

EXAMPLE 2

The procedure was as in Example 1, but the amount of binder was reduced.

| | | |
|---|---|---|
| Binder | 48.6 g of polymethyl methacrylate | 24.3% by weight |
| Plasticizer | 63.2 g of propylenecarbonate | 31.6% by weight |

-continued

| Conductive salt | 10.6 g of lithium perchlorate | 5.3% by weight |
|---|---|---|
| Filler | 77.6 g of Aerosil R8200 | 38.8% by weight |

The mechanical and electrical data are shown in Table 1.

EXAMPLE 3

The procedure was as in Example 1, but a different binder was employed.

| Binder | 61.0 g of ethylene-vinyl acetate copolymer (proportion of vinyl acetate: 36%) | 30.5% by weight |
|---|---|---|
| Plasticizer | 56.4 g of propylenecarbonate | 28.2% by weight |
| Conductive salt | 10.6 g of lithium perchlorate | 5.3% by weight |
| Filler | 72.0 g of Aerosil R8200 | 36.0% by weight |

A film having a transparency of 81% was obtained. The mechanical and electrical data are shown in Table 1.

Comparative Example 1

The procedure was as in Example 1, but no filler was employed.

| Binder | 95.4 g of polymethyl methacrylate | 47.7% by weight |
|---|---|---|
| Plasticizer | 94.0 g of propylenecarbonate | 47.0% by weight |
| Conductive salt | 10.6 g of lithium perchlorate | 5.3% by weight |

The mechanical and electrical data are shown in Table 1.

Comparative Example 2

The procedure was as in Example 2, but no filler was employed.

| Binder | 125.0 g of polymethyl methacrylate | 62.5% by weight |
|---|---|---|
| Plasticizer | 64.4 g of propylenecarbonate | 32.2% by weight |
| Conductive salt | 10.6 g of lithium perchlorate | 5.3% by weight |

The mechanical and electrical data are shown in Table 1.

TABLE 1

Properties of the films from the Examples and Comparative Examples.

| | Direct-current conductivity [S/cm] | Mechanical ball impression diameter in [mm] | Mechanical assessment |
|---|---|---|---|
| Example 1 | $1*10^{-5}$ | 3 | good |
| Example 2 | $7*10^{-5}$ | 3.3 | good |
| Example 3 | $1.1*10^{-5}$ | 3.9 | OK |
| Comparative Example 1 | $4*10^{-5}$ | 9.2 | flowing, much too soft |
| Comparative Example 2 | $8*10^{-6}$ | 4 | too soft |

The Examples and Comparative Examples show that films having suitable hardness and conductivity are only obtained using fillers. Without filler, only soft films are obtained. If the proportion of binder in films without filler is increased and the proportion of plasticizer decreased in order to obtain a less-soft film, the conductivity decreases significantly.

We claim:

1. An optically transparent polymeric solid electrolyte having a light transparency of >80% and a conductivity of greater than $10^{-6}$ S/cm at 20° C., comprising at least one polymeric binder having a glass transition temperature of $T_g$ of <−30° C., at least one filler having a primary particle size of from 1 nm to 20 $\mu$m, at least one conductive salt, at least one ion-solvating plasticizer, and optionally, further additives and auxiliaries.

2. A solid electrolyte as claimed in claim 1, wherein the filler is an inorganic filler having a primary particle size of from 1 nm to 300 nm.

3. A film consisting of a solid electrolyte as claimed in claim 1.

4. A solid electrolyte film as claimed in claim 3, wherein the solid electrolyte is in a crosslinked form.

5. A process for the production of an optically transparent polymeric solid electrolyte film having a light transparency of >80%, a conductivity of greater than $10^{-6}$ S/cm at 20° C. and a glass transition temperature $T_g$ of <−30° C., which comprises mixing at least one polymeric binder, at least one filler having a primary particle size of from 1 nm to 20 $\mu$m, at least one conductive salt, at least one ion-solvating plasticizer, and optionally, further additives and auxiliaries, intensively with one another and thermoplastically shaping the mixture to give a film.

6. A process as claimed in claim 5, wherein the film is crosslinked photochemically, thermally or by electron radiation.

7. In an electrochromic glazing system, in which the light transparency can be adjusted reversibly and steplessly, which comprises a first glass sheet, a first transparent electroconductive layer, an electrochromic electrode, an electrolyte, a counterelectrode, a second transparent electroconductive layer and a second glass sheet, the improvement comprising the presence of the optically transparent polymeric solid electrolyte of claim 1 as said electrolyte.

* * * * *